Nov. 22, 1932.  J. A. VAUGHN  1,888,521

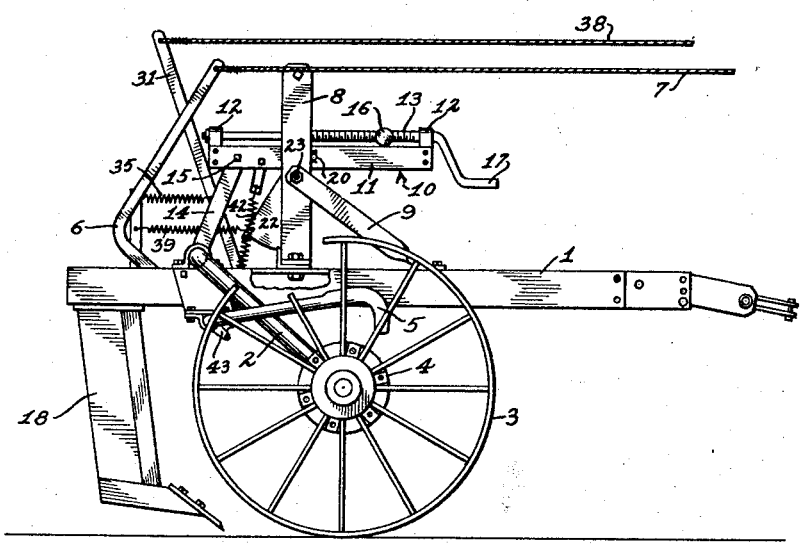

LOCKING AND TRIPPING DEVICES FOR POWER LIFT IMPLEMENTS

Original Filed Oct. 12, 1931  2 Sheets-Sheet 2

Inventor
Jesse A. Vaughn

By
Lyon & Lyon
Attorneys

Patented Nov. 22, 1932

1,888,521

UNITED STATES PATENT OFFICE

JESSE A. VAUGHN, OF LOS ANGELES, CALIFORNIA, ASSIGNOR TO KILLEFER MANUFACTURING CORPORATION, LTD., OF LOS ANGELES, CALIFORNIA, A CORPORATION OF CALIFORNIA

LOCKING AND TRIPPING DEVICE FOR POWER LIFT IMPLEMENTS

Original application filed October 12, 1931, Serial No. 568,258. Divided and this application filed July 12, 1932. Serial No. 622,065.

My invention relates to improved locking and tripping devices for a power lift agricultural implement, and has particular reference to a power lift earth working tool which will securely lock the implement in an elevated or carrying position.

An object of this invention is to provide an improved locking and tripping device for a power lift earth working tool which will securely lock the implement in an elevated carrying position, and which improved locking means may be easily released to permit the implement to drop, due to gravity, to its operative or cultivating position.

This invention is a division of that disclosed in my copending application Serial No. 568,258, filed October 12, 1931, for improved locking and tripping device for a power lift implement.

In the ordinary heavy type of power lift implement the operator must exert considerable effort to release the locking means and as the locking means are released many times during the normal operation of the implement the effect is very fatiguing. It is therefore a further object of this invention to provide a release for the locking means of such an implement which may be easily actuated by the operator.

A further object of this invention is to provide a locking means which is strong and yet simple in construction.

Other objects and advantages of this invention will be apparent as the nature of the same is more fully understood from the following description and accompanying drawings, wherein is set forth what is now considered to be a preferred embodiment of the invention. It should be understood, however, that this particular embodiment of the invention is chosen principally for the purpose of exemplification, and that variations therefrom in details of construction or arrangement of the parts may accordingly be effected and yet remain within the spirit and scope of the invention as the same is set forth in the appended claims.

In the drawings:

Figure 1 illustrates a side elevation of an agricultural implement with the invention applied thereto, a portion of the ground wheel having been broken away to more clearly illustrate the tripping device.

Figure 2 is an enlarged fragmental view, partly in section, of the upper portion of the implement, in which the parts are illustrated in the position they assume when the implement is locked in elevated position.

Figure 3:
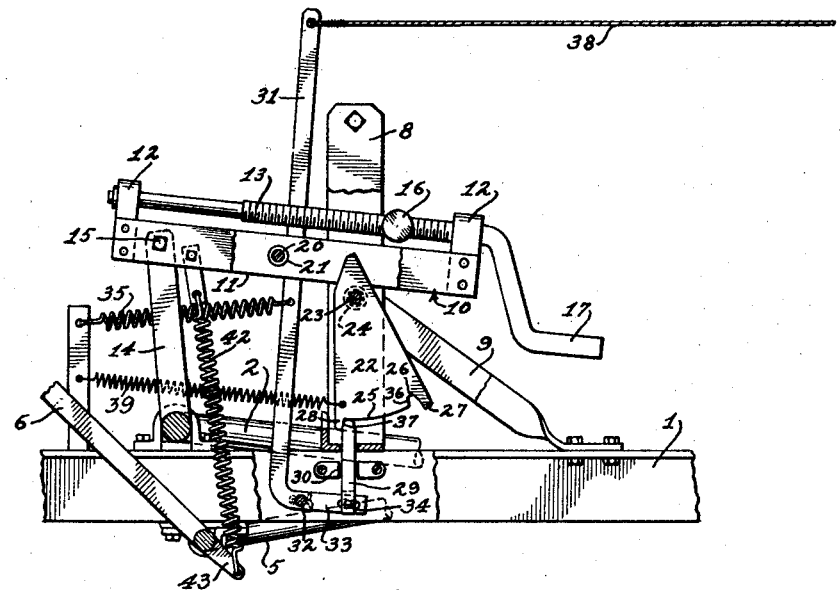
Figure 3 illustrates a view similar to Fig. 2, but illustrating the parts in the position they assume when the implement has dropped into operative position.

My improved locking and tripping device may be applied with advantage to any form or type of earth working or carrying tool, such as a plow, cultivator, harrow, scraper, or the like. For the purpose of illustration, I have shown my invention as applied to that form of agricultural implement illustrated and described in the patent to A. W. Hudson, No. 1,710,222, dated April 22, 1929, which form of implement is commonly referred to as a subsoil plow.

In Figure 1 my invention is illustrated as applied to a subsoil plow which includes, briefly, a frame 1 having a crank axle 2 journaled transverse thereof. Journaled upon the opposite ends of the crank axle are road wheels 3 each carrying a trundle or ratchet wheel 4 which is adapted to be engaged by hooks or pawls 5. The pawls 5 are journaled upon the frame and are provided with an actuating lever 6 which may be provided with a rope 7 for ease of operation. A standard 8 is mounted upon the frame and braced thereto by means of the brace members 9.

Figure 4:
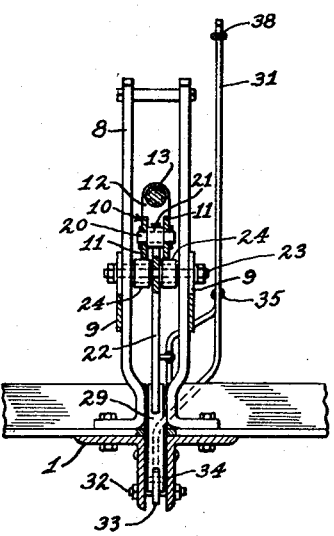
Figure 4 is a fragmental cross sectional view, taken substantially in the plane indicated by the line 4—4 of Figure 2, and in the direction of the arrows.

Slidably mounted through the standard 8 is a sliding control bar 10 which preferably includes two spaced parallel bars 11 (note Figure 4). Secured at each end thereof are bearing blocks 12 through which are journaled the threaded adjusting rod 13. The crank axle 2 carries a crank arm 14 which at its upper end is pivotally mounted to the sliding control bar 10, adjacent the rear end thereof by means of a bolt 15. By this arrangement of parts, as the crank axle rotates the control bar 10 is caused to slide through the standard 8. By placing appropriate stops upon the control bar, the travel thereof, and thereby the relative rotation of the crank axle, may be controlled. In order to govern the depth to which the earth working tools are lowered into the soil, it is preferred to make one of the stops adjustable. For this purpose the threaded adjusting rod 13 is provided with an elongated stop nut 16 adapted to engage the standard when the implement has dropped to the desired position.

The location of stop nut 16 is adjusted by rotating the adjusting rod by means of crank handle 17.

Suitably located upon the frame is an appropriate earth working tool 18. It is sometimes desirable to elevate and maintain the tool 18 in elevated position, and for this purpose a locking means is provided which engages and holds the control bar from sliding rearwardly. As will be understood by those skilled in the art, a rearward movement of the control bar will permit the crank axle to rotate in a direction which will result in the lowering of the frame with relation to the wheels so that the tool which is carried thereby will return to working relation with the ground.

The locking means for retaining the control bar in its forward position may include, as most clearly illustrated in Figures 2 and 3, a stop pin 20 carried by the bars 11. An antifriction roller 21 is journaled upon the stop pin 20 between the bars 11 to render the releasing of the locking means easier and also to prevent excessive wear of the stop pin. A latch 22 is pivotally mounted upon the standard 8 by means of a shaft 23.

By referring particularly to Figure 4, it will be observed that the shaft 23 may also be utilized for connecting the upper ends of the brace members 9 to the standard and also by means of the antifriction rollers 24 to slidingly support the control bar 10. The upper end of the latch 22 is positioned to engage and retain the roller 21 and through stop pin 20 to lock the control bar in the position as illustrated in Figures 1 and 2. The latch 22 is pivotally mounted upon the standard and would swing to release the control bar if not retained from doing so by a suitable tripping or releasing means.

The latch 22 is provided at its lower end with a quadrant 25 which, adjacent its forward end, is provided with a locking notch 26 having a stop lug 27 adjacent thereto. The rear end of the quadrant is provided with a stop lug 28.

In Figure 2 I have illustrated the latch 22 as being retained in locking position by a sliding bolt 29, slidably mounted in the implement frame as at 30. A trip release lever 31 is pivoted to the frame 1 by a pivot pin 32 and is provided with a forwardly extending portion 33 pivotally and slidably connected to the sliding bolt 29 as at 34. To yieldingly retain the sliding bolt in the notch 26 a spring 35 yieldingly acts between the trip lever 31 and the frame 1.

To facilitate an easy release of sliding bolt 29 from notch 26 of the latching lever the engaging edge 36 of quadrant notch 26 and the edge 37 of bolt 29 may be slightly tapered.

Referring particularly to Figure 2, it will be observed that the implement is shown there in locked elevated position. When it is desired to lower the implement into working position, the trip rope 38 is actuated to swing the lever 31 forwardly, thereby sliding the bolt 29 out of the quadrant notch 26. The weight of the implement will cause the latch 22 to swing to the position indicated in Figure 3, whereupon the stop roller 20 will roll over the end of the latch. As soon as the stop roller 21 passes over the end of the latch the implement will drop until the stop nut 16 engages the front face of the standard 8.

The release lever may be very easily swung even though a large, heavy implement is operated, due to the great leverage of lever 31 and to the inclined surfaces 36 and 37 of the locking notch and bolt and because the weight of the implement is utilized to swing latch 22 into the releasing position. In other words, the release of the locking means is self-acting once the bolt 29 is moved out of the notch 26.

The implement may be elevated, as is fully described in the previously mentioned patent to A. H. Hudson by swinging the hooks 5 to engage the trundle wheels 4. When the implement is elevated to the predetermined height, the hooks are automatically disengaged from the trundle wheels to stop further lifting thereof. Just before the release of the lifting means takes place it is desirable to lock the implement in its elevated position, and this is accomplished by returning the latch 22 to its initial position, after swinging it to release the control bar by means of the spring 39, suitably connecting the frame and the latch lever 22 (note Figures 2 and 3). As soon as the latch 22 returns to its initial position, the sliding bolt again turns to its initial position, the sliding bolt again engages the notch 26 to retain the latch 22 in locking position.

As will be observed from the drawings, the rear face of latch 22, adjacent the upper end thereof, is inclined as at 41 to enable roller 21 to ride thereon to lift the control bar over this end of the latch. Shortly after the roller 21 passes over the upper end of the latch the lifting means are automatically disconnected and if it were not for the stop roller 21 engaging the forward face of the latch the implement would return to its operative position.

To aid the control bar in dropping into locking position, a spring 42 may be provided. It is also desirable to return the hooks 5 to their inactive position when automatically released from the trundle wheels, and, therefore, spring 42 may be connected at one end to a forwardly extending portion 43 of the elevating lever 6, while the opposite end thereof may be suitably connected to the control bar, thus utilizing spring 42 for a dual purpose.

While I have illustrated the preferred embodiment of my invention, it is to be understood that the foregoing description is for illustrative purposes only, and I do not desire to be limited by any of the details shown or described, except as defined in the appended claims.

I claim:

1. A lock and release device for an earth working implement of the lift type including a sliding control bar, a stop means carried thereby, a pivoted latch having one end adapted to engage said stop means, a retaining means operatively engaging the other end of said latch for holding said latch means in locking position, and a release means operable for actuating said retaining means to release said latch for unlocking said control bar.

2. A lock and release device for an earth working implement of the lift type including a sliding control bar, a stop means carried thereby, a pivoted latch means having one end adapted to engage said stop means, a retaining means operatively engaging the other end of said latch for holding said latch means in locking position, a release means operable for actuating said retaining means to release said latch for unlocking said control bar, and a spring means for returning said latch to locking position.

3. In a power lift implement, the combination of a frame, an earth working tool carried thereby, a crank axle journaled to said frame, wheels journaled upon said axle, means for elevating said frame, means for disconnecting said elevating means, and means for locking said frame in elevated position including, a sliding control bar operatively connected to said axle, a latch means for locking said bar, a retaining means for holding said latch in locking position, and a release means operable for actuating said retaining means to release said latch for unlocking said control bar so that the frame can drop back to its operative position.

4. In a power lift implement, the combination of a frame, an earth working tool carried thereby, a crank axle journaled to said frame, wheels journaled upon said axle, means for elevating said frame, means for disconnecting said elevating means, means for locking said frame in elevated position including a sliding control bar, operatively connected to said axle, a latch means for locking said bar, a retaining means for holding said latch in locking position, a release means operable for actuating said retaining means to release said latch for unlocking said control bar so that the frame will drop back to operative position, and a spring means for returning said latch to locking position.

Signed at Los Angeles, California, this 5th day of July, 1932.

JESSE A. VAUGHN.